Sept. 29, 1942.                J. O. PARR, JR                    2,297,319
                               SEISMIC CIRCUITS
                            Filed June 18, 1940         2 Sheets-Sheet 2

Inventor
Josephus O. Parr, Jr.
By Watson, Cole, Grindle & Watson
Attorney

Patented Sept. 29, 1942

2,297,319

UNITED STATES PATENT OFFICE 2,297,319

SEISMIC CIRCUITS

Josephus O. Parr, Jr., San Antonio, Tex., assignor to Olive S. Petty, San Antonio, Tex.

Application June 18, 1940, Serial No. 341,215

19 Claims. (Cl. 177—352)

This invention relates to methods of and apparatus for seismic surveying or prospecting and particularly relates to the construction and use of electrical equipment adapted for associating a transducer and a galvanometer-recorder whereby the electrical equivalents of seismic shocks picked up by the transducer are treated so as to be more satisfactorily recorded than with apparatus and methods heretofore known.

Certain well-known difficulties in the recording of artificially created seismic waves as used for prospecting have already been appreciated and efforts have been made to overcome them. Such waves have, within their usable range, orders of intensity or energy content, varying between 1 and 600 or more. It is obviously difficult, if not impossible, to accurately record the electrical equivalents of such seismic waves each in its relative amplitude, and certainly it is not feasible to do this on portable equipment. The chart used for the record would become unduly cumbersome and prohibitively expensive and the equipment would be so ponderous as to be entirely non-portable.

Previous workers have devised various forms of automatic volume control equipment in an endeavor to provide a record-trace from each seismometer which is of more nearly uniform size throughout its length, but the results have not always been satisfactory because of the very unusual conditions oftentimes encountered in various sections of the country caused by unusual geological formations, depths and locations of "shots" etc.

The general methods of use of seismic apparatus have become more or less standardized. That most generally accepted at the present time for what is known as reflection shooting, consists in the creation of artificial seismic waves by firing a charge of dynamite at the bottom of a water-filled hole deep enough to reach through the weathered layer of the earth and contact a more dense layer. Such holes may extend from ten to fifty or more feet in depth and their depth is of considerable importance since shots made too near the surface tend to impart too much energy to waves which travel along or near the surface and are a disturbing factor in the recording operations. Such waves may be of the so-called Rayleigh type resulting in "ground roll."

The seismic waves generated by the explosion travel in all directions and those travelling downwardly are reflected from the respective interfaces existing between abutting strata and return to the surface upon which is distributed a plurality of seismometers at varying distances from the shot-point. Each of these seismometers is arranged to convert the seismic wave energy into electric waves of corresponding intensity and in sympathy with the seismic waves. The electric waves, which are relatively feeble, are amplified and conducted each to one element of a multiple element recording galvanometer. The type most generally used and hereinafter referred to in this specification is one having a plurality of strings mounted in spaced parallel relation in the intense field of an electromagnet. A beam of light directed through the plane of the strings acts on a sensitized moving film and causes shadows cast by the strings to produce traces on the record, each trace representing the action of one seismometer.

The strings are very close together and very delicate and cannot be subjected to strong currents without being damaged or given such deflections as to cause their traces to tangle badly and it is possible that there may be actual physical entanglement of the strings. For this reason the amplifiers are equipped with one form or another of automatic volume control which tends to reduce as much as possible the higher intensities of the earlier or primary waves which reach the seismometers with but little attenuation, while at the same time attempting to maintain the amplitude of the later arriving more important waves of a size sufficient to convey the necessary information to the computer who subsequently studies the records.

In order that these so-called automatic volume control devices may function properly, they must have some delayed action, that is, after an impulse of excess energy arrives and causes the automatic volume control to reduce the gain of the amplifier, this gain must not return immediately to normal for otherwise the chart might be a series of first large and then small pulsations. This feature of delayed action, however, is sometimes highly detrimental. If the delay is considerable in respect to the length of the total chart and this is usually desirable, then every time a heavy wave arrives during the recording of the more desirable waves, the amplifier gain is reduced to such an extent and for such a long period that the trace is not of sufficient size for the following wanted waves.

In accordance with the present invention and comprising the principal object thereof, an amplifier of the automatic volume control type is provided with means whereby the amount of automatic control is substantially directly proportional to the intensity of the first arriving or so-called "primary waves," but thereafter is restrained from the control of waves of intensities which if they arrived earlier would initiate the operation of the control.

An important feature of the invention comprises the arrangement of one or more amplifier stages having their gain controllable by the action of an automatic volume control device, itself responsive both to amplifier output intensities greater than a predetermined threshold value and to its own output, whereby the AVC takes over its own control after having once been placed in operation during the life of a seismic wave train, i. e., throughout the duration of the waves represented on a single chart.

Another important feature of the invention consists in the arrangement of an amplifier and an automatic volume control device therefor, wherein the first operation of the automatic volume control provides a reservoir of energy to maintain the amplifier gain at a level dependent upon the intensity of the initial waves received by the amplifier, together with means whereby this reservoir serves to change the threshold value of the waves necessary for placing the automatic volume control device in action.

A further important feature of the invention consists in the arrangement of an amplifier and automatic volume control therefor which permits the placing of the "shot" charge in a shallower hole.

Other and further objects and features of the invention will be more apparent to those skilled in the art upon a consideration of the accompanying drawings and following specification wherein is disclosed a single exemplary embodiment of the invention with the understanding that such changes may be made therein as fall within the scope of the appended claims without departing from the spirit of the invention.

Figure 1:
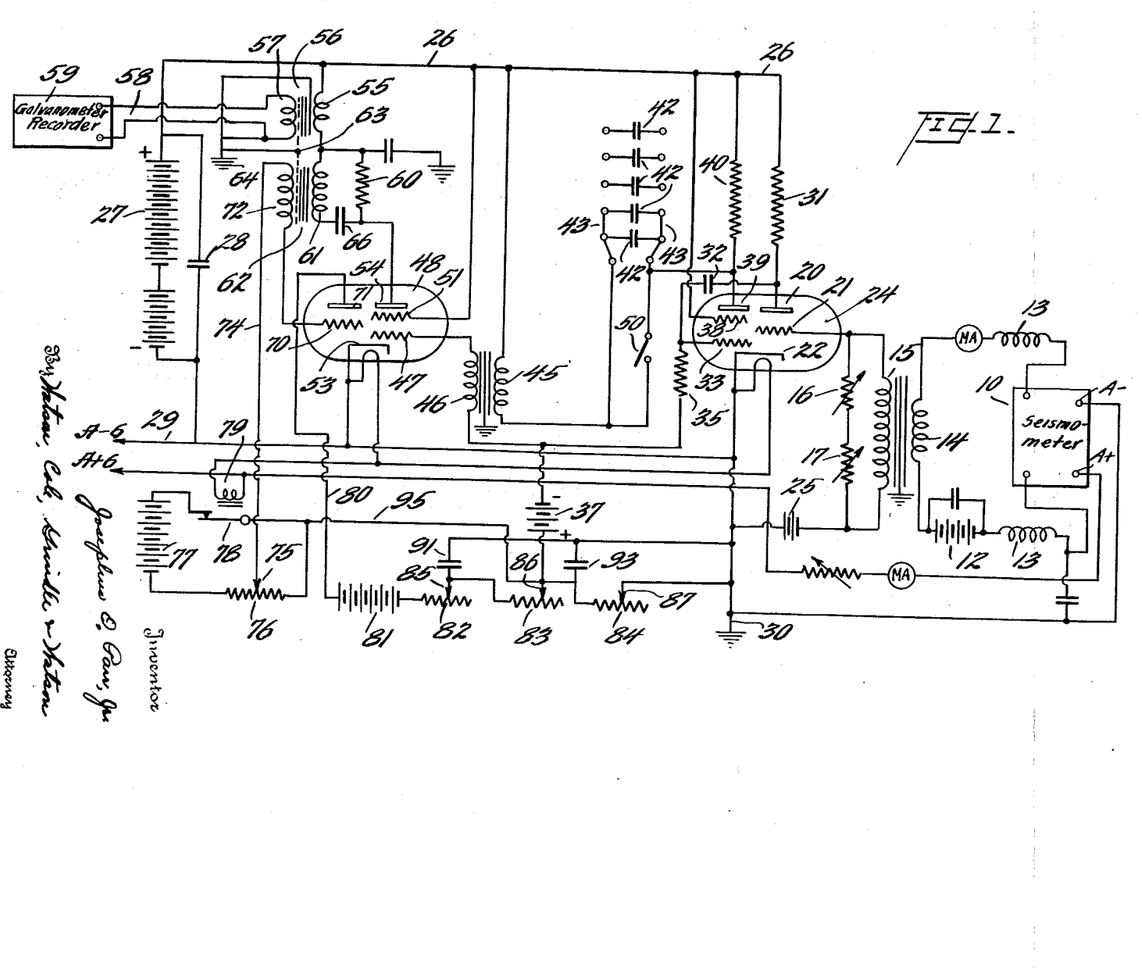
Figure 1 is a wiring diagram of an amplifier constructed according to the present invention shown connected between a seismometer and a recording-galvanometer.

Figure 1 of the drawings illustrates a typical circuit arrangement capable of functioning to provide the desired novel results. It will be appreciated of course that many details of the circuit may be changed in various ways without departing from the primary function thereof, since certain elements of the circuit are, in a sense, conventional and subject to modifications, for instance, in accordance with the type of tube or tubes used, the style of interstage coupling desired for any particular purpose, the frequency response characteristics, and the like.

In Figure 1 there is disclosed at 10 any conventional form of seismometer. The one illustrated is of the electro-mechanical transducer type and may be actuated by the relative displacement of condenser plates controlling the frequency of oscillation of a thermionic tube-energized oscillating circuit whereby the output is a voltage variable with frequency. This output is delivered from the tube plate battery 12 through appropriate radio frequency chokes 13 into the primary 14 of a coupling transformer, the secondary 15 of which delivers to the input of the first stage of the amplifier. A pair of series-connected rheostats 16 and 17, respectively for coarse and fine adjustments, shunt the secondary 15 in order to determine the portion of the seismometer output which is delivered to the input of the amplifier.

The first stage of the amplifier includes the anode 20, the control grid 21, and the cathode 22 of a thermionic tube 24 which for convenience and compactness, in the portable equipment desired for seismic prospecting, contains two sets of elements, both functioning with the single cathode. One terminal of the transformer secondary 15 is connected to the control grid 21 and the other terminal to the cathode, a bias battery 25 being interposed in this circuit to determine the potential of the control grid. The plate or anode 20 of the tube is energized from the high voltage conductor 26 leading from the positive pole of the battery 27 shown at the left-hand side of the drawing. This battery is shunted by a by-pass condenser 28 and the negative terminal is returned to the A-conductor 29 common to the heaters of the several tubes shown, as well as the one in the seismometer. This conductor is grounded as shown at 30 and is also connected to the several cathodes.

The output of the first stage of the amplifier is coupled to the second stage by means of the plate resistor 31 and coupling condenser 32, the first being in the anode circuit and the second connecting the plate 20 to the control grid 33 forming one of the second set of elements in the tube 24. The grid resistor 35 is in a shunt circuit associated with this grid and is connected to the negative pole of the grid bias battery 37. The screen grid 38 and the anode 39 of the second stage of the amplifier are connected as shown to the conductor 26 leading to the B battery and a plate resistor 40 is interposed between this conductor and the plate 39.

In thermionic amplifiers for seismic work it is important to discriminate between frequencies and always to favor the band of frequencies between approximately 50 and 100 cycles since the important seismic information is obtainable from signals having frequencies in this range. Above this range, spurious signals may be received resulting from various disturbances of both seismic and electrical natures. Such higher frequency signals and preferably also lower ones, should be eliminated as far as possible from the output of the amplifier and this can be done by arranging each stage thereof to act in the nature of a low-pass filter. For this purpose, care is taken to select the constants of the coupling resistor 31 and condenser 32 for the purpose. Likewise the coupling resistor 40 between the second and third stages is carefully selected as to size. In order to give the operator a choice of capacites for coupling the second stage to the third, so that he may adjust the response frequency, a plurality of small condensers 42 are arranged for connection in parallel, if so desired, by the use of links 43 or switches, and one pole of these condensers is arranged for connection between a point intermediate the plate 39 and the plate resistor 40. The other pole is connected to conductor 26, a transformer primary 45 being interposed in the circuit.

The secondary 46 of this transformer is coupled directly to the control grid 47 of the third stage amplifier comprising the tetrode elements of the dual tube 48. It will be seen that the interstage coupling between the second and third stages of the amplifier is of an unusual type combining both the features of the usual resistance-coupling with those of the more or less conventional transformer coupling. The transformer, however, does not conduct any of the direct current to the anode of the second stage, this being taken care of solely by the resistance-coupling. A study of the circuit will show that the transformer primary 45 is energized as the result of changes in the voltage drop across the plate resistor 40 about which it is shunted with the selected number of small condensers 42 interposed in the circuit. These condensers and the resistor 40 constitute a further and adjustable low-pass filter. If desired, the condensers may be shunted out for certain purposes by closing the switch 5C. The core of the transformer 45, 46 is preferably grounded.

The end of the secondary 46 opposite the control grid 47 is connected to the same source of grid bias as is the grid 33, i. e., the battery 37. The screen grid 51 of the third stage amplifier is connected to the conductor 26. It will be appreciated that the screen grids in both the second and third stages improve the gain of these stages and permit smoother automatic volume control of the type to be later described.

The output circuit of the third-stage amplifier, including the cathode 53 and the anode 54 is conducted through the primary 55 of an output transformer 56, the secondary 57 of which is connected by conductors 58 to a conventional galvanometer-recorder 59.

Current is fed from the conductor 26 to the anode 54 through the primary 55 and the resistor 60 which shunts the primary 61 of a second transformer 62 which may have a common core with the first transformer, although as shown, it has only a common static shield 63 connected to ground at 64. The primary 61 is energized, in a manner similar to the primary 45 of the interstage coupling transformer between the second and third stages, by having a coupling through the condenser 66 which supplies the primary with alternating current only, resulting from varying voltage drops occurring in the resistor 60 determined by the amount of output current flowing to the anode 54.

The left-hand portion of tube 48 constitutes a triode including the cathode 53, the control grid 70, and the anode 71. The function of this triode is to act as an automatic volume control and for the sake of convenience the initials "A. V. C." will be used hereinafter to refer to the tube and its functions. The control grid 70 is directly connected to one terminal of the secondary 72 of the output transformer whose primary 61 is resistance-coupled to the output of the third stage of the amplifier. The grid 70 receives a negative bias by having the opposite end of the secondary winding 72 connected by conductor 74 to the slider 75 on the potentiometer 76 which is connected across the bias battery 77. The circuit of this battery passes through the normally open switch 78 closed by the solenoid 79 connected in series in the A-battery circuit. Thus the battery 77 is not discharged through the potentiometer 76 unless the whole amplifier is turned on by closing the A-battery switch (not shown).

The adjustment of the slider 75 on the potentiometer 76 determines the value of output voltage necessary to place the A. V. C. tube into action. The adjustment is always such as to bias the tube below the cut-off point, i. e., the grid bias is sufficiently negative so that no current flows in the anode circuit of this tube under ordinary circumstances. In fact, the bias is so negative that a positive signal in the secondary 72 must be above a predetermined voltage in order to start current flowing in the anode circuit and this value is selected by the setting of the slider 75 in accordance with the conditions of operation as interpreted by the operator. This permits the operation of the whole amplifier without automatic volume control unless the output signal exceeds the predetermined or threshold voltage value as set by the potentiometer 76.

The anode circuit of the A. V. C. tube starts with the plate 71 which is connected by conductor 80 to a separate B-battery 81, the negative pole of which is connected to ground at 30 through adjustable rheostats 82, 83 and 84 connected in series and provided respectively with sliders 85, 86 and 87 as shown. Slider 86 is connected to the positive pole of the grid-bias battery 37 which controls the potentials on the grids of the second and third stages of the amplifier.

It will be seen that when no current is flowing in the anode circuit of the A. V. C. tube the positive pole of battery 37 is substantially at ground potential since the grid current is negligible. The bias on the grids 33 and 47 is therefore determined by the potential of the battery 37 and the gain of the amplifier is fixed thereby. However, when current flows in the circuit of the anode of the A. V. C. tube, this current from the battery 81 flows through the resistors 82, 83 and 84 and the point 86 changes its potential in respect to ground in accordance with the voltage drop existing between the point 86 and ground, i. e., in accordance with the adjusted amount of the rheostat 84 and the value of anode current. The point 86 becomes negative, to ground, to the extent of the voltage drop in the operating portion of the resistance 84 and this negative amount is algebraically added to the potential of the battery 37 to increase the bias on the grids of the second and third-stage tubes to thereby reduce their amplification factor or gain. For any particular setting of the slider 87 on the resistor 84 the gain of the second and third-stage tubes will be proportional to the current flowing in the plate circuit of the A. V. C. tube, for the drop in the resistor 84 will be directly proportional to the amount of current flowing in this plate circuit. It will therefore be seen that the amplitude of output of the whole amplifier, a portion of which is returned to the grid 70 of the A. V. C. tube, will be the controlling factor in regulating the gain of the second and third stages thereof.

At this point it may be well to consider the types of waves customarily delivered to the amplifier from the seismometer. When the explosion takes place several types of seismic waves are sent out. The first to be received by the seismometer are those usually termed "primary" waves travelling close to the surface of the earth and of large amplitude. These are followed and sometimes overlapped by the waves reflected from various interfaces below the surface of the earth, the reflected waves from the separate interfaces following each other to some extent in accordance with the depths from which they are reflected.

The whole train of waves received by any one seismometer extends over a period of several seconds and in addition to the types of waves referred to above, other forms of lesser importance for seismic information but of great importance as disturbing factors are received. First in order of amplitude among these may be the so-called Rayleigh waves resulting in what is in the vernacular referred to as "ground roll." Such waves seem to travel more slowly than the primary waves and often arrive while the reflected waves are being recorded. Rayleigh waves seem in many cases to have an energy content inversely proportional to the depth of the shot hole. For this reason the charge is usually fired at considerable depth and the drilling of the hole is costly and time-consuming.

The reflected waves following their first reception by the seismometer attenuate rapidly due to the length of time during which they have been in existence and because the later ones arrive from greater depths and have suffered losses in energy due to their greater paths of travel, absorption in the various media and the like.

The ideal amplifier recorder would be one that recorded all wanted waves with a general level on the record which was nearly uniform. This does not mean that the whole record would be a substantially horizontal straight line, for the individual variations in wave intensities must appear, but there should not be too great variations in their amplitudes. This is for the purpose not only of keeping the record on a reasonable sized chart, but to prevent damage to the recording apparatus, the various galvanometer elements of which are delicate and susceptible to damage if deflected to too great an extent. Furthermore, high amplitudes may cause tangling of these elements in certain types of galvanometers and overlapping of the traces thereof on the records, making them difficult to interpret. The higher velocities of the recording elements attributable to greater displacements make the shadows on the record charts form extremely thin lines, sometimes entirely invisible. With the ideal amplifier, these difficulties would be overcome and the chart would consist in a series of records, one for each recording element, in which none of the deflections were of such great magnitude as to interfere with the next trace and yet all were of sufficient magnitude to make it easy to read the record and note the points of inflection of vital importance to obtain the information necessary.

Unfortunately, such an ideal amplifier is not yet available, but automatic volume control has heretofore been resorted to in an effort to prevent unduly large deflections of the recording elements resulting from very strong primary and Rayleigh waves which sometimes have an energy content as much as 600 times as great as the later reflected waves. If, however, such automatic volume control is set to function sufficiently to reduce the record of the high energy waves to a reasonable size, then as the reflected waves begin to attenuate, the trace becomes almost a straight line and unreadable. There is, therefore, incorporated in the present amplifier, means to supply automatic volume control to reduce the gain of the amplifier by the action of the first-received high-energy waves and to cause the amplifier gain to increase only gradually throughout substantially the duration of the reflected waves. By having the gain increase gradually to normal, compensation is had for the attenuation of the reflected waves and a more uniform trace on the record is provided.

It has already been explained how the reception of waves of greater amplitude than a predetermined value causes functioning of the A. V. C. tube. If this value is set at approximately the amplitude of the first received reflected waves, then the operation of the A. V. C. will cease when the reflected waves begin to arrive at the seismometer and if no means are taken to prevent it, the gain of the amplifier will become normal for the remainder of the operation. This is not desirable since the setting for the original gain would have to be sufficiently low to maintain the first portion of the reflected waves at a reasonable size and the later portion would then be too small for use. The normal gain is therefore set to produce a greater than necessary output from the first of the reflected waves to arrive. The gain is prevented, however, from returning to normal after being reduced by the large primary waves until close to the end of the whole record by means which will now be described.

The combined resistances 83 and 84 in the anode circuit of the A. V. C. tube are shunted to ground by the condenser 91 of relatively large capacity, say about 1 microfarad and the resistor 84 is shunted to ground in addition by the condenser 93 of similar capacity. These condensers are subjected to a potential resulting from the voltage drop in their respective resistor sections when the A. V. C. tube is in operation and are thereby charged to provide substantially the same potential at slider 86. These condensers being of large capacity hold a sufficient quantity of current to maintain the operation of changing the bias on the amplifier grids for a considerable period after the A. V. C. tube has ceased operating. It will be seen that when no anode current flows in the resistors 82, 83 and 84 the condenser 91 discharges through resistors 83 and 84 and fixes a potential at the point 86 determined by the rate of flow through these two resistors, the setting of which is adjusted for the purpose. Likewise the condenser 93 discharges through the resistor 84 and maintains a potential at the point 86 which will balance that maintained there by the condenser 91 to augment the bias on the amplifier grids. The rate at which condenser 93 discharges is fixed by the setting of its shunting resistor 84.

Apparatus as heretofore discribed is substantially disclosed and claimed in the application of Olive Scott Petty, Serial No. 290,928, filed August 18, 1939. In that disclosure, however, the return from the potentiometer 76 is to ground which insures operation of the A. V. C. tube each time that an output signal voltage exceeds the threshold value set by this potentiometer. Under some conditions, as previously stated, the so-called ground roll arrives during the recording of the very important reflected waves, and since its signals have a high amplitude they readily operate the A. V. C. and lower the gain of the tubes to such an extent below the gain on which they were being recorded that the following portions of the record of the reflected waves are of such low amplitude as to be substantially unintelligible.

In accordance with the present invention the A. V. C. tube is arranged to respond, for its first operation, in proportion to the intensity of the primary waves, but thereafter it is no longer under the control of the output of the amplifier. This is effected by returning the positive side of potentiometer 76 by the conductor 95 to the point 86 on the slider on the resistor 83, so that there is superimposed on the A. V. C. bias effected by the battery 77 and potentiometer 76 the negative voltage dependent upon the drop in the A. V. C. plate circuit or that resulting from the discharge of the condensers 91 and 93 as heretofore described. This insures against re-operation of the A. V. C. tube unless the later signal is of such great extent that it can overcome the initial setting of the potentiometer 75 plus the additional bias produced from the point 86. In this unlikely case there will be only a slight operation of the A. V. C. tube and probably not sufficient to build up the voltage in the condensers 91 and 93 to as high a potential as they already have achieved. In any case, re-operation of the A. V. C. tube is materially reduced in effectiveness or entirely prevented by removing its control, after first operation, from the output of the amplifier to the extent of the additional bias being placed on the amplifier tube grids as originally determined by the anode current in the A. V. C. tube.

The time elapsing between the first functioning of the A. V. C. and the locking of the same against further operation to the extent described above is controllable by the setting of sliders 85 and 86. The lower the resistances of the rheostats controlled by these sliders the shorter the interval. This is evident from the fact that these resistances are in series with anode battery 81 and hence exert a controlling function on the rate of charge of condensers 91 and 93. The higher the rate of charge the quicker is a voltage available of sufficient potential to lock the A. V. C. tube against further action.

Figure 2:
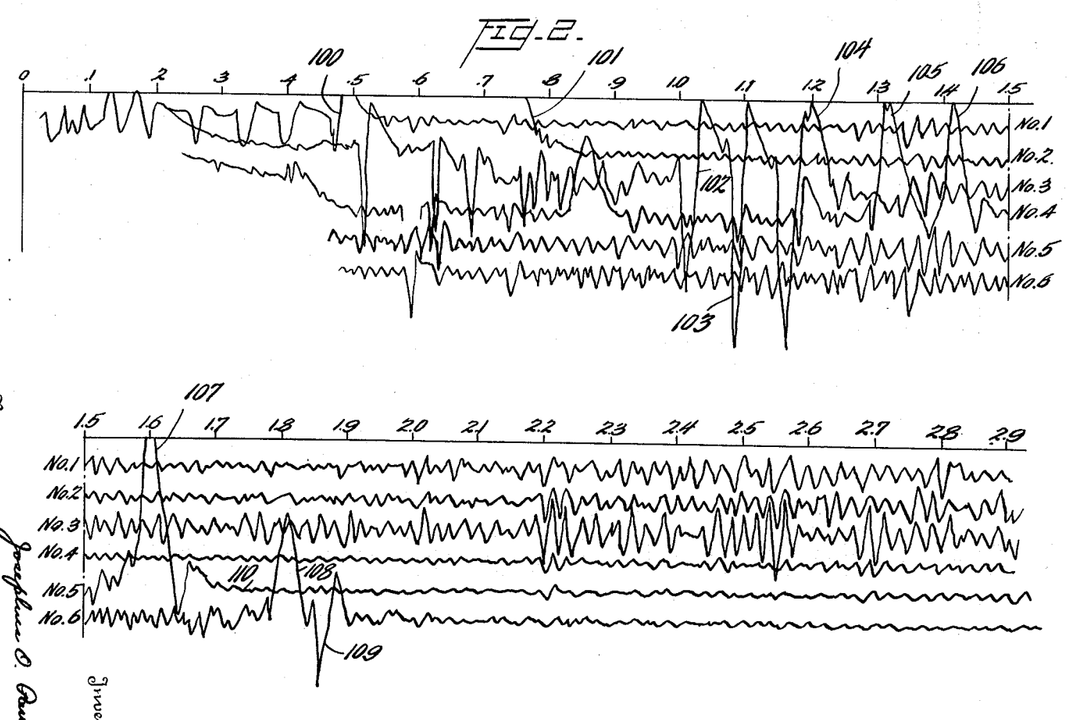
Figure 2 is a view in two parts of the record made from a seismic blast using a plurality of seismometers, one of which is connected to an amplifier in accordance with the present invention, the others being connected to previously known types of amplifiers.

The result of this change in control will be more readily apparent from an inspection of Figure 2 of the drawings wherein is reproduced in two sections an actual chart made in field operations from a single shot acting on six seismometers each equipped with an A. V. C. amplifier. Seismometers 1, 2, 4, 5 and 6 as indicated by the corresponding numbers on the traces of Figure 2 were equipped with amplifiers of the type disclosed in the previously mentioned Petty application, while seismometer No. 3 was equipped with an amplifier constructed according to the present invention. The traces on the record are accurately reproduced except where, in some cases, the front portions thereof, representative of high energy waves are somewhat confused or unreadable.

In Figure 2 the numbers along the top are representative of seconds elapsed since the "time-break" or shot instant, and they show that the chart records or traces were made over approximately three seconds. The early or left portion of each of the traces 1 to 6 is more or less illegible as a result of the tremendous energy of the primary waves, particularly those arriving at the closer seismometers bearing the lower numbers. This results from the inability of the automatic volume control devices to cope with the tremendous variations in converted seismic energy, but it will be noted, for instance, that trace No. 1 levels out at about .5 second after a deflection 100, which is so large that it leaves the chart. Trace No. 2 does not begin to show in a legible manner on the chart until about .76 second, where the return from a large deflection is shown at 101. Probably earlier portions could be found on the original. Trace No. 3, recording the improved results, shows a plurality of wide deflections 102, 103, and 104, while trace No. 4 shows two, 105 and 106. Trace No. 5 is relatively small and uniform until 1.6 seconds, where a wide deflection 107 is indicated, and trace No. 6 shows two relatively large deflections, 108 and 109 occurring at 1.8 and 1.9 seconds respectively.

The earlier portions of each trace quiet relatively quickly due to the operation of the A. V. C., and it will be seen, for instance in trace No. 5, that the early portion of the record is of such size to provide sharp deflections and yet it remains within its own bounds without interfering with the adjacent traces. However, where trace No. 5 indicates deflection 107, it clearly shows the arrival of a Rayleigh wave of very high intensity. As previously mentioned, these waves usually arrive after the primary waves and often during the reflected waves. The gain of the amplifier has already been reduced by the operation of the A. V. C. initiated by the primary waves, which do not show on this particular trace, so that the portion of the record ahead of deflection 107 is of reasonable size as just described. However, when the Rayleigh wave of great intensity actuates the seismometer, the A. V. C. is thrown into powerful gain-reducing action, and because of its delay characteristics the trace following 107 is flattened out to such an extent, as shown beginning at 110, that it is almost useless until very close to the end of the record.

The arrival of the Rayleigh wave is indicated on trace No. 6 at 108, 109, somewhat later than on trace No. 5, because of the greater distance of this seismometer from the shot point, and all of the record following the Rayleigh deflection is flattened to too great an extent to be usable. Similar conditions are clearly visible in trace No. 4, where, following the deflections 105 and 106, the record is flattened beginning at 1.5 seconds and extending to about 2.5 seconds, where the delay action of the volume control begins to go out of play and the gain returns toward normal.

In traces 1 and 2 the flattened areas immediately follow the deflections 100 and 101, respectively, of the Rayleigh waves arriving early in the record at these closer seismometers. The flattening effect is evident throughout the whole first half of the record for both of these traces, and it is not until at a point near two seconds that they begin to return to a satisfactory usable size. All of these faults are the result of permitting the A. V. C. to remain in an active state and ready to be brought into operation by any large wave received by its seismometer.

Consider now trace No. 3. It can be seen that perhaps the A. V. C. action is not quite so complete at the early part of the trace, but beginning at about .7 second the record is of reasonable size and quite readable. However, when the Rayleigh waves hit, the A. V. C. is no longer available for further gain reduction, so instead of one single deflection, as in most of the other traces, and which is immediately damped out by the A. V. C., to the detriment of the rest of the record, three big deflections 102, 103 and 104 are shown, but as soon as 104, the latest of these, terminates, the whole remainder of the record is of usable size, and of substantially the same amplitude as before the Rayleigh waves were recorded.

In accordance with the present invention, therefore, there has been substituted, on the average record shown, for a portion of the record, which is useless for well over a second in most cases, several wide deflections lasting for only about .2 second with the remainder of the record in perfect shape. The gain of the amplifier is not changed to any appreciable extent for its normal gradual enhancement following the reception of the Rayleigh waves. The only portion of the record showing any detrimental effects is that at the instant of reception of these waves and only for their duration.

Aside from the obvious benefits to the record from this arrangement, a further and very great benefit results. It has already been pointed out that the intensity of the Rayleigh waves is inversely proportional to the depth of the shot hole. Since Rayleigh waves do no substantial damage to a record made with an amplifier constructed according to the present invention, it will be appreciated that much shallower shot holes can be made with a consequent saving in time, labor, cost of materials, and quantity of water necessary for tamping the charge. Since in certain arid countries this water must be carried in tank wagons and even on the backs of laborers for great distances, this saving is of great assistance.

Furthermore, the improved type of amplifier materially simplifies the work of the party chief in charge of making the records. He is enabled to set the various amplifiers with respect to gain, delay, and the like with a much greater chance of correctness than heretofore. The problem is always solved largely by guess work and knowledge of the operator gained from prior work in the same neighborhood, but he can never exactly guess which seismometers will be subjected to ground roll and which will not. If, for instance, the settings used for gain on amplifiers Nos. 1, 2, 4, 5, and 6, had been used on a record where ground roll did not exist, the front portions of the records would have been too large to use instead of too small, as happened.

It should be kept in mind that the primary advantage of the present amplifier is that the automatic setting of the A. V. C. is dependent upon the size of the primary waves, but their size has no effect on the amount that the record is spoiled by the arrival of ground roll, or Rayleigh waves. These waves only disturb the record during their occurrence and not subsequent thereto. The amplifier of the present invention is provided with a "single" action A. V. C. and not one that can be repeated with every large disturbance.

Having thus described the invention, what is claimed as new and desired to be secured by Letters Patent is:

1. An amplifier system for use in seismic surveying, including in combination, cascaded thermionic amplifier tubes having control elements, an automatic volume control tube having a control element, means feeding a portion of the amplifier output to the control element of said A. V. C. tube, and means to apply a predetermined portion of the output of the A. V. C. tube to the control element of one of said amplifier tubes to regulate the gain thereof, said means also applying said portion to the control element of said A. V. C. tube.

2. An amplifying system for amplifying a train of waves extending over a period of several seconds and in which the first part of the train has a general amplitude level several times greater than that of the remainder and in which the general level of the remainder gradually decreases, comprising in combination, a thermionic amplifier, means to apply said wave train thereto, output means for the amplifier to deliver the amplified train to a recorder, means initially responsive to that portion of the amplitude of the amplifier output which is in excess of a predetermined threshold value to automatically reduce the gain of the amplifier, means to return the gain to normal at a gradual rate spread over the greater portion of the train length to compensate for normal decrease in amplitude and means to prevent a reoperation of the gain reducing means during the operation of said gain return means except upon the occurrence of output several times greater than said threshold value.

3. Apparatus for making records of seismic waves generated at a shot-point and received at a surface station remote therefrom, comprising a seismometer at the said station adapted to convert said waves into electro-motive-forces of voltages indicative of the amplitude and in sympathy with said waves, an amplifier for magnifying said voltages, a galvanometer-recorder for recording the same in respect to time intervals, said amplifier including means to reduce the normal gain thereof, means to gradually return the gain to normal over a period of several seconds, said first mentioned means being responsive only to amplifier output voltages in excess of a predetermined value, and, when said second means is in operation, only to output voltages several times higher than said value.

4. Apparatus for making records of seismic waves generated at a shot-point and received at a surface station remote therefrom, comprising a seismometer at the said station adapted to convert said waves into electro-motive-forces of voltages indicative of the amplitude and in sympathy with said waves, an amplifier for magnifying said voltages, a galvanometer-recorder for recording the same in respect to time intervals, and means responsive only once during the receipt of said waves to an amplifier output in a range between a predetermined minimum value and a maximum determined by the intensity of the first response, to reduce the gain of said amplifier, and means to gradually return said gain to normal over a period of the order of the duration of the waves.

5. Apparatus for making records of seismic waves generated at a shot-point and received at a surface station remote therefrom, comprising a seismometer at the said station adapted to convert said waves into electro-motive-forces of voltages indicative of the amplitude and in sympathy with said waves, an amplifier for magnifying said voltages, a galvanometer-recorder for recording the same in respect to time intervals, means responsive only once during the receipt of said waves to an amplifier output in a range between a predetermined minimum value and a maximum determined by the intensity of the first response, to reduce the gain of said amplifier, means to gradually return said gain to normal over a period of the order of the duration of the waves, and means to adjust the rate of return of said gain to normal.

6. Apparatus for making records of seismic waves generated at a shot-point and received at a surface station remote therefrom, comprising a seismometer at the said station adapted to convert said waves into electro-motive-forces of voltages indicative of the amplitude and in sympathy with said waves, an amplifier for magnifying said voltages, a galvanometer-recorder for recording the same in respect to time intervals, means responsive only once during the receipt of said waves, to an amplifier output which is greater than a predetermined value but less than several times this value, to reduce the gain of said amplifier, means to gradually return said gain to normal over a period of the order of the duration of the waves, and means to non-linearly change the rate of return of said gain to normal.

7. An amplifier arrangement for levelling the output of a seismic detector comprising in combination, a thermionic tube amplifier stage responsive to and for raising the level of low frequency oscillations, said tube having a normally biased control element, an automatic volume control tube having a control element biased below cutoff, means for feeding a portion of the A. C. output of said amplifier stage to the control element of said A. V. C. tube to oppose said bias, and means for rendering the bias of the control element of the amplifier tube and the control element of the A. V. C. tube more negative in accordance with and responsive to increases in the output of the A. V. C. tube.

8. An amplifier arrangement for levelling the output of a seismic detector comprising in combination, a thermionic tube amplifier stage responsive to and for raising the level of low frequency oscillations, an automatic volume control tube having a control element, means for feeding a portion of the A. C. output of said amplifier stage to the control element of said A. V. C. tube, means initially biasing said A. V. C. tube to deliver plate current only when the amplifier output exceeds a predetermined value, means increasing the amount of negative bias of said amplifier tube in proportion to the increase in A. V. C. plate current, and means to simultaneously increase the amount of negative bias of said A. V. C. tube.

9. An amplifier arrangement for levelling the output of a seismic detector comprising in combination, a thermionic tube amplifier stage responsive to and for raising the level of low frequency oscillations, an automatic volume control tube having a control element, a negative bias potential for the control element of said A. V. C. tube sufficient to prevent plate current flow therein, means to algebraically combine said potential and a positive portion of the A. C. output of said amplifier tube to reduce the negative amount of said bias sufficiently when the amplifier output in excessive to cause plate current flow in the A. V. C. tube, means using said plate current to control the amplifier gain, and means responsive to A. V. C. plate current flow to increase the amount of negative bias potential for the A. V. C. tube.

10. A recording system for seismic waves occurring in a train extending over a period of several seconds in which the first part of the train has a general amplitude level several times greater than that of the remainder and in which the general level of the remainder gradually decreases, comprising in combination, a transducer for converting said waves into voltages indicative of the amplitude and in sympathy with said waves, an amplifier for said voltages associated with said transducer, a recorder connected to the output of said amplifier, said amplifier including a tube having a control element, an automatic volume control tube having a control element associated with said output, a source of negative bias voltage for said second mentioned element having its positive side at ground potential and being adjusted in value to prevent current flow in the anode circuit of the A. V. C. tube until said output exceeds a predetermined value, means in said anode circuit to increase the negative value of the bias on said amplifier tube control element upon the flow of current in the anode circuit, said last mentioned means being so arranged that under the same conditions of anode current flow it changes the positive side of said bias voltage source to a potential point negative to ground to increase the negative amount of said predetermined value.

11. A recording system for seismic waves occurring in a train extending over a period of several seconds in which the first part of the train has a general amplitude level several times greater than that of the remainder and in which the general level of the remainder gradually decreases, comprising in combination, a transducer for converting said waves into voltages indicative of the amplitude and in sympathy with said waves, an amplifier for said voltages associated with said transducer, a recorder connected to the output of said amplifier, said amplifier including a tube having a control element, an automatic volume control tube having a control element associated with said output and a cathode, a source of negative bias voltage for said second mentioned element having its positive side at cathode potential and being adjusted in value to prevent current flow in the anode circuit of the A. V. C. tube until said output exceeds a predetermined value, a resistor in the said anode circuit the drop across which increases the amount of negative bias on said amplifier tube control element when anode current flows and proportional thereto, and means to change the potential to which said positive side of said bias voltage source is connected to one more negative than cathode potential.

12. In an amplifier, in combination, means to automatically and variably adjust the gain thereof in accordance with the intensity of the output above a threshold value, and further means actuated by the first said means to change the threshold value at which the adjusting action of said first mentioned means is started.

13. In an amplifier of the type described, in combination, an amplifier stage, an A. V. C. means responsive to at least a threshold value of output of the amplifier to adjust the gain of the stage proportional to output in excess of said value, means to return said gain to normal over a period of several seconds, and means to hinder reoperation of the A. V. C. during said return.

14. In an amplifier of the type described in combination, an amplifier stage, A. V. C. means in control of said stage and adapted to provide upon initiation a relatively level output for said amplifier, said A. V. C. means being constructed for trigger type actuation by signals above a predetermined value to provide such output, and means under the control of said A. V. C. means to render the A. V. C. means unresponsive to triggering values of the order of the initiating one, over a predetermined period.

15. In an amplifier of the type described, in combination, at least one stage of thermionic tube amplification, an A. V. C. tube associated to vary the gain of said stage and initially inoperative below a threshold output from said amplifier, means responsive to an output of said stage above said threshold to initiate operation of the A. V. C. tube to adjust said gain, and means responsive to an operation of the A. V. C. tube to hinder subsequent re-initiation of the adjusting action.

16. In an amplifier of the type described, in combination, at least one stage of thermionic tube amplification, an A. V. C. tube associated to vary the gain of said stage and initially inoperative below a threshold output from said amplifier, means responsive to an output of said stage above said threshold to initiate operation of the A. V. C. tube to adjust said gain, and means responsive to an operation of the A. V. C. tube to hinder subsequent re-initiation of the adjusting action thereof for a period determined by the amount of the initiating output above said threshold.

17. In an amplifier of the type described, in combination, at least one stage of thermionic tube amplification, a threshold triggered A. V. C. tube associated therewith to vary the gain of said stage, means responsive to an output of said stage above a predetermined minimum to initiate operation of the A. V. C. tube to adjust said gain, means responsive to an operation of the A. V. C. tube to prevent a subsequent re-initiation of the adjusting action thereof for a period predetermined by the size of said output above said minimum, except upon the occurrence of a signal at the input to said stage which would cause an output, at full gain, substantially larger than said minimum, and means to adjust said period.

18. A recording system for seismic waves occurring in a train extending over a period of several seconds in which the first part of the train has a general amplitude level several times greater than that of the remainder and in which the general level of the remainder gradually decreases, comprising in combination, a transducer for converting said waves into voltages indicative of the amplitude and in sympathy with said waves, an amplifier for said voltages associated with said transducer, a recorder connected to the output of said amplifier, said amplifier including a tube having a control element, an automatic volume control tube having a control element associated with said output, a source of negative bias voltage for said second mentioned element normally adjusted to prevent current flow in the anode circuit of the A. V. C. tube until said output exceeds a predetermined value, means responsive to current flow in said anode circuit to increase the amount of negative bias on the control elements of both tubes and a condenser associated with said anode circuit so as to be charged to the extent of and by said bias increase, said condenser being adapted to maintain an excess negative bias on said elements after its charging voltage is removed.

19. A recording system for seismic waves occurring in a train extending over a period of several seconds in which the first part of the train has a general amplitude level several times greater than that of the remainder and in which the general level of the remainder gradually decreases, comprising in combination, a transducer for converting said waves into voltages indicative of the amplitude and in sympathy with said waves, an amplifier for said voltages associated with said transducer, a recorder connected to the output of said amplifier, said amplifier including a tube having a control element, an automatic volume control tube having a control element associated with said output, a source of negative bias voltage for said second mentioned element normally adjusted to prevent current flow in the anode circuit of the A. V. C. tube until said output exceeds a predetermined value, means responsive to current flow in said anode circuit to increase the amount of negative bias on the control elements of both tubes and a condenser associated with said anode circuit so as to be charged to the extent of and by said bias increase, said condenser being adapted to maintain an excess negative bias on said elements after its charging voltage is removed, and means to regulate the rate of discharge of said condenser.

JOSEPHUS O. PARR, Jr.

---

CERTIFICATE OF CORRECTION.

Patent No. 2,297,319. September 29, 1942.

JOSEPHUS O. PARR, JR.

It is hereby certified that error appears in the printed specification of the above numbered patent requiring correction as follows: Page 5, second column, line 74, after "extent" insert --except--; page 7, first column, line 49, claim 9, for "in excessive" read --is excessive--; and that the said Letters Patent should be read with this correction therein that the same may conform to the record of the case in the Patent Office.

Signed and sealed this 23rd day of February, A. D. 1943.

(Seal)

Henry Van Arsdale,
Acting Commissioner of Patents.

CERTIFICATE OF CORRECTION.

Patent No. 2,297,319. September 29, 1942.

JOSEPHUS O. PARR, JR.

It is hereby certified that error appears in the printed specification of the above numbered patent requiring correction as follows: Page 5, second column, line 74, after "extent" insert --except--; page 7, first column, line 49, claim 9, for "in excessive" read --is excessive--; and that the said Letters Patent should be read with this correction therein that the same may conform to the record of the case in the Patent Office.

Signed and sealed this 23rd day of February, A. D. 1943.

(Seal)

Henry Van Arsdale,
Acting Commissioner of Patents.